SATURABLE CORE PULSE WIDTH MODULATOR

Filed Feb. 19. 1964

KEITH O. JOHNSON
INVENTOR
BY Stuart Lubitz
ATTORNEY 3,275,949

SATURABLE CORE PULSE WIDTH MODULATOR

Keith O. Johnson, Los Angeles, Calif., assignor to Ampex Corporation, Redwood City, Calif., a corporation of California Filed Feb. 19, 1964, Ser. No. 345,962
2 Claims. (Cl. 332—12)

The present invention relates to pulse modulation and, more particularly to an improved circuit for pulse width modulation.

A modulating circuit operates generally to produce a composite waveform, some characteristic of which varies in accordance with an instantaneous value of an input signal. In pulse width modulation the instantaneous value of the input signal is represented in the output signal, which consists of a succession of pulses, by the varying widths of the pulses. Thus the width of any given pulse is a function of the instantaneous value of that portion of the input signal it represents.

In pulse width modulation, although the available time interval between pulses may remain constant, a certain portion of the time interval remains unused, even by the widest pulse. The ratio of the portion of the time interval which is used to the total available time interval generally is called the duty cycle. Previously available pulse width modulators have been limited to maximum changes in the duty cycle of about 50% and have also required a relatively large number of individual circuit elements.

An object of the present invention is to provide an improved pulse width modulator. Another object is the provision of a pulse width modulator with a high duty cycle range. Another object is the provision of a more reliable pulse width modulating circuit of simple construction.

These and other objects of the invention are more particularly set forth in the following detailed description and in the accompanying drawings of which:

FIGURES 4*a*, 4*b* and 4*c* are curves representing signals at various points in the circuit of FIGURE 1.

In general, the disclosed embodiment of a pulse modulating circuit operates by alternately coupling complementary signals of opposite polarity to an input winding of a device capable of changing from one state of operation to another state of operation in a time interval dependent upon the voltage applied to the input winding. The complementary signals of opposite polarity are provided at the input winding by coupling the input winding and an input signal alternately in series with a positive direct current source and with a negative direct current source by a pair of switch means. The switch means are alternately operated in response to the device completing its change from one state of operation to the other. Each time the device changes from one state of operation to the other, an output pulse is generated. The width of each pulse is dependent on the time it takes for the magnetic device to change from one state of saturation to the other, which, as previously set forth, is determined by the voltage applied to the input winding, and thus by the voltage of the applied signal.

Figures 1, 2:
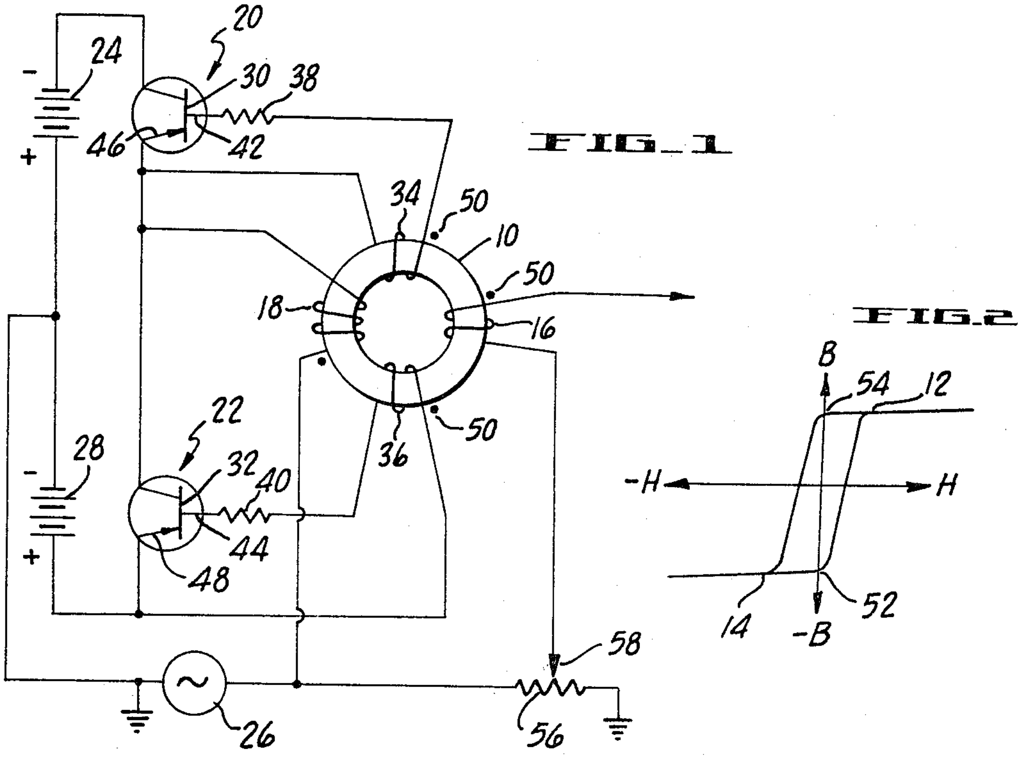
FIGURE 1 is a schematic diagram of one embodiment of a pulse width modulating circuit.
FIGURE 2 is a representation of a rectangular hysteresis characteristic curve of a magnetic core suitable for use in the circuit of FIGURE 1.

More specifically, in the embodiment illustrated in FIGURE 1, the device utilizes a tape wound, toroidal magnetic core 10 having a substantially rectangular hysteresis loop, i.e., a bistable core, such as shown in FIGURE 2, and capable of being saturated in two distinct states 12 and 14. Pulses of varying widths are induced in an output winding 16 wrapped around the magnetic core 10 by a change in magnetic flux as the core is changed from one state of saturation to the other. As the core 10 becomes saturated the change in flux ceases and the induced pulse terminates. The core is reversibly changed from one state of saturation to the other by alternately applying positive and negative signals to the input winding 18 wrapped around the core 10, as described hereinafter.

Figures 3, 4:
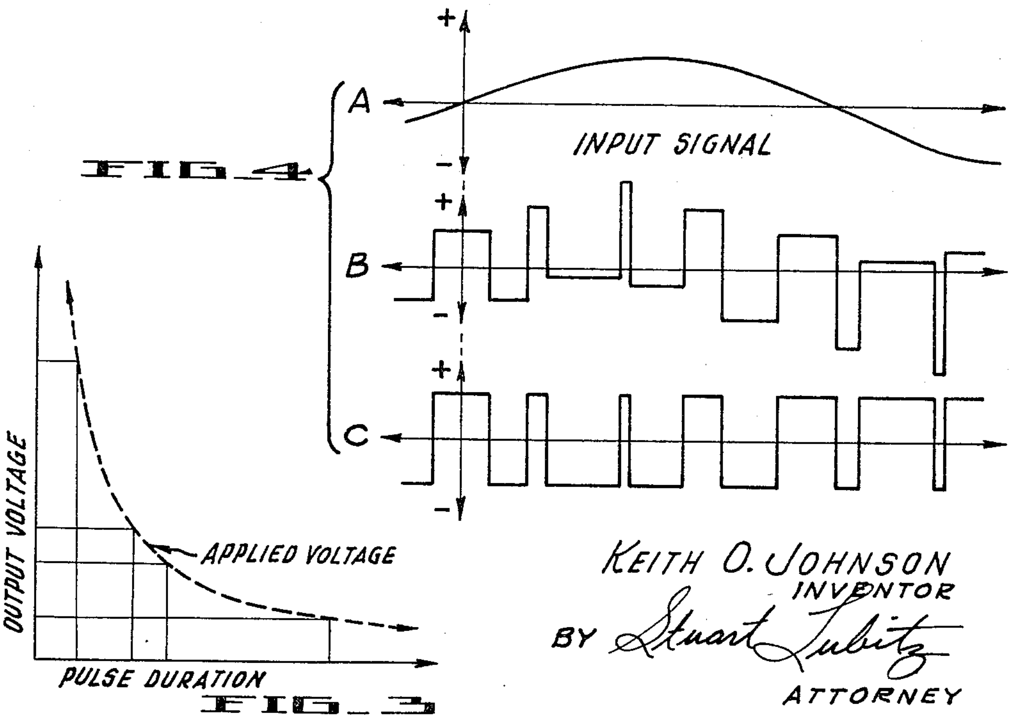
FIGURE 3 shows the relationship between the voltage and the duration of the output pulses generated by the circuit of FIGURE 1 for variations in the amplitude of applied signals.

The duration of the induced pulses is dependent upon the time it takes for the core to switch states. Because of the core's rectangular hysteresis characteristic, this time interval is an inverse function of the voltage applied to the input winding 18. FIGURE 3 shows a plot of the voltage of the output pulses and the duration of the output pulses for variations in the voltage of the applied signal. As the applied voltage increases, the output voltage increases, but the duration of the output pulses decreases. However, the area under each pulse, i.e., the product of the output voltage times pulse duration, remains unchanged as the applied voltage is varied. Thus, by varying the applied voltage, the width of the output pulse is controlled.

The alternate positive and negative signals are applied to the input winding 18 by the pair of alternately operated switch means 20 and 22. One of the switch means 20 is connected in series with the source of positive potential 24, the input signal 26, and the input winding 18, and the other switch means 22 is connected in series with the source of negative potential 28, the input signal 26 and the input winding 18. As illustrated, each of the switch means includes a p-n-p transistor 30 and 32 which operates either in cut off or in saturation. The switching of the transistors 30 and 32 is controlled by control windings 34 and 36, respectively wound on the core and respectively connected in series with a current limiting resistor 38 and 40 between the base 42 and 44 and emitter 46 and 48 of the transistors 30 and 32.

As shown in FIGURE 1 the output winding 16 and the control windings 34 and 36 are wound on the core so that the pulses induced therein are positive at the dotted end 50 of each winding as the core 10 changes from negative saturation 14 to negative remanence 52 and from negative remanence 52 to positive saturation 12. The induced pulses are negative at the dotted ends 50 as the core 10 changes from positive saturation 12 to positive remanence 54 and from positive remanence 54 to negative saturation 14.

The circuit of FIGURE 1 starts to oscillate because of unbalance between apparent identical switching circuits 20 and 22 of the transistors 30 and 32. Assume that more current flows through the first transistor 30 and the core 10 is at positive remanence 54. This current flow through the input winding 18 causes the core flux to move toward negative saturation 52 inducing a voltage in the control windings 34 and 36. The negative end of the first control winding 34 is connected to the base 42 of the first transistor 30 and the positive end of the second control winding 36 is connected to the base 44 of the second transistor 32. The signals induced in the first control winding 34 and the second control winding 36 drive the first transistor 30 and the second transistor 32, respectively, further into saturation and cut off.

When the core reaches negative saturation 14, the pulses induced in the first control winding 34, as well as the other induced pulses, terminate causing the first transistor 30 to stop conducting. Since the first transistor 30 is no longer conducting, the positive signal is disconnected from the input winding 18 and the core 10 changes from negative saturation 14 to negative remanence 52. As the core changes to negative remanence the small induced signals are positive at the dotted end 50 of the control winding rendering the second transistor 32 conductive. The conducting second transistor 32 applies the negative signal to the input winding 18 causing the core 10 to change to positive saturation 12. As the core 10 changes to positive saturation 12, the pulses induced in the first control winding 34 and second control winding 36 drive the first transistor 30 and the second transistor 32, respectively, further into cut off and saturation.

When the core 10 reaches positive saturation 12, the induced pulses terminate causing the second transistor 32 to stop conducting. Since the second transistor is no longer conducting, the negative signal is disconnected from the input winding 18 and the core 10 changes from positive saturation 12 to positive remanence 54. This change initiates conduction in the first transistor 30 and causes repetition of the cycle of operation.

Since the input signal 26 is alternately coupled in series with a positive potential 24 and a negative potential 28, the input signal effectively either subtracts or adds to a D.-C. voltage applied to the input winding 18, that is, complementary signals are alternately applied to the input winding 18. Since the width of the output pulses depend upon the applied voltage, this results in the width of the positive pulses varying inversely with the width of the negative pulses. In this way, the time interval between successive output pulses (the period) remains constant even though the duration of each pulse varies with the signal applied to the input winding 18.

As previously set forth, an output pulse is induced in the output winding 16 every time the core 10 changes states. When an input signal such as shown in FIGURE 4*a* is utilized, an output pulse train such as shown in FIGURE 4*b* is induced in the output winding 16. Because of the previously explained constant voltage-time product not only does the duration of the output pulses vary with the applied voltage, but as seen in FIGURE 4*b*, so does the pulse amplitude. In order to remove this varying amplitude component, a preselected portion of the input signal 26 is connected in series opposition with the output signal. In this connection, one end of the input signal 26 is grounded and a potentiometer 56 is connected between the other end of the input signal 26 and ground. The tap 58 of the potentiometer 56 is connected to one end of the output winding 16 and the output signal is taken between ground and the other end of the output winding 16. The tap 58 is positioned to cancel out the varying amplitude component. The amplitude varying component may also be eliminated by the use of any suitable clamping or limiting circuit coupled to the output winding. It may also be eliminated taking the output at point 46. This output is shown in FIGURE 4*c*.

In one illustrated embodiment of the modulator the core is a 400 Maxwell tape wound bobbin utilizing tape for example of ⅛ mil thickness such as manufactured by Magnetics, Inc., and known by the trade name Orthonal. An input winding of 270 turns and control and output winding of 75 turns, all of No. 40 wire are wound on the core. The transistors are 2N597, the supply sources are 15 volts each, and the limiting resistors are 100 ohms. The maximum output pulse width of such a modulator is 700 microseconds, the minimum output pulse width is 20 microseconds and the frequency of a suitable input signal is 8 kilocycles.

The disclosed circuit is an efficient pulse width modulator capable of better than 90% duty cycle range. The circuit is composed of few elements and, because of its simple construction, is reliable. It can be used in high power configuration where high efficiency is required.

Various changes and modifications can be made in the above described modulator without deviating from the spirit of scope of the present invention.

Various of the features of the invention are set forth in the following claims.

What is claimed is:

1. A pulse width modulator comprising a bistable magnetic core capable of assuming two states of magnetic saturation, said core including a single input winding, a first control winding, a second control winding, a source of positive D.-C. voltage, a source of negative D.-C. voltage, said first control winding responsive to the change of said core from one state of saturation to the other state of saturation for generating a first control signal, said second control winding responsive to the change of said core from said other state of saturation to said one state of saturation for generating a second control signal, a first transistor switch including a base, an emitter, and a collector, said base being connected to said first control winding for rendering said first transistor conductive in response to said first control signal, said emitter being connected to a junction between said single input winding and said first control winding, said collector being connected to said positive source; said first transistor when conductive applying a first signal to said single input winding, second transistor switch including a second base, a second emitter and a second collector, said second base being connected to said second control winding for rendering said second transistor conductive in response to said second control signal, said second emitter being connected to a junction between said negative source and said second control winding, said second collector being connected to the junction between said single input winding and said first control winding and thus to said first emitter, said second transistor when conductive applying a second signal complementary to said first signal to said single input winding, said core changing from said one state of saturation to said other state of saturation at a rate which is a function of the amplitude of said first signal, said core changing from said other state of saturation to said first state of saturation at a rate which is a function of the amplitude of said second signal, said junction between the single input winding and the first control winding providing an output which is responsive to each change of state of said core for generating an output pulse, whereby an output pulse is provided the width of which is a function of the rate of each change and wherein the amplitude modulator of the output pulse is eliminated.

2. A pulse width modulator comprising a bistable magnetic core capable of assuming two states of magnetic saturation, said core including a single input winding, a first control winding, a second control winding, and an output winding, a source of positive D.-C. voltage, a source of negative D.-C. voltage, said first control winding responsive to the change of said core from one state of saturation to the other state of saturation for generating a first control signal, said second control winding responsive to the change of said core from said other state of saturation to said one state of saturation for generating a second control signal, a first transistor switch including a base, an emitter, and a collector, said base being connected to said first control winding for rendering said first transistor conductive in response to said first control signal, said emitter being connected to a junction between said single input winding and said first control winding, said collector being connected to said positive source, said first transistor when conductive applying a first signal to said single input winding, second transistor switch including a second base, a second emitter and a second collector, said second base being connected to said second control winding for rendering said second transistor conductive in response to said second control signal, said second emitter being connected to a junction between said negative source and said second control winding, said second collector being connected to the junction between said single input winding and said first control winding and thus to said first emitter, said second transistor when conductive applying a second signal complementary to said first signal to said single input winding, said core changing from said one state of saturation to said other state of saturation at a rate which is a function of the amplitude of said first signal, said core changing from said other state of saturation to said first state of saturation at a rate which is a function of the amplitude of said second signal, said output winding responsive to each change of state of said core for generating an output pulse, whereby an output pulse is provided the width of which is a function of the rate of each change, and said input signal is connected in series with said output winding through a single variable resistor for eliminating amplitude modulation of said output pulse.

References Cited by the Examiner

UNITED STATES PATENTS

| | | | |
|---|---|---|---|
| 2,875,412 | 2/1959 | Kaplan | 332—12 |
| 2,994,840 | 8/1961 | Dorsman | 332—12 |
| 3,008,095 | 11/1961 | Przedpelski | 332—18 |

ROY LAKE, *Primary Examiner.*

A. BRODY, *Assistant Examiner.*